United States Patent [19]

Roesky et al.

[11] Patent Number: 4,941,772
[45] Date of Patent: Jul. 17, 1990

[54] METHOD OF DISPOSING OF SALT-CONTAINING DUSTS FROM INCINERATOR PLANTS

[75] Inventors: Werner Roesky, Overath; Dieter Deffner, Bergisch Gladbach; Manfred Wolter, Leverkusen, all of Fed. Rep. of Germany

[73] Assignee: Sante Corporation, Largo, Fla.

[21] Appl. No.: 339,711

[22] Filed: Apr. 18, 1989

[51] Int. Cl.$^5$ ................................................. B09B 3/00
[52] U.S. Cl. ...................................... 405/128; 106/707; 106/710; 106/705; 106/792; 405/129
[58] Field of Search ........................ 405/128, 266, 129; 166/292; 106/74–78, 103, 105, 85; 252/633, 628, 8.512; 210/751

[56] References Cited

U.S. PATENT DOCUMENTS

| | | | |
|---|---|---|---|
| 4,354,876 | 10/1982 | Webster | 405/128 X |
| 4,432,666 | 2/1984 | Frey et al. | 405/129 |
| 4,615,809 | 10/1986 | King | 405/129 X |
| 4,701,219 | 10/1987 | Bonee | 405/129 X |
| 4,737,356 | 4/1988 | O'Hara et al. | 404/129 X |
| 4,741,776 | 5/1988 | Bye et al. | 405/129 X |

*Primary Examiner*—Dennis L. Taylor
*Attorney, Agent, or Firm*—Bradford E. Kile

[57] ABSTRACT

For the disposal of salt-containing dusts of incinerator plants, with addition of water the salt-containing dusts are intensively mixed with other waste materials, such as ashes and fly ashes from thermal power plants fired with hard coal or brown coal, waste materials from foundries containing quartz sands and waste materials from calcium carbide production, the mixture containing at least 8% hydrothermally reactive calcium oxide or equivalent amounts of other hydrothermally reactive calcium compounds and the water addition being so rated that an optimum compacting is possible and the mixture is thereafter processed by compacting to give stable firm compacts and the compacts subsequently hardened in an autoclave by saturated steam at a pressure of at least 1 bar.

35 Claims, No Drawings

METHOD OF DISPOSING OF SALT-CONTAINING DUSTS FROM INCINERATOR PLANTS

BACKGROUND OF THE INVENTION

1. Field of the Invention

The invention relates to a method for the disposal of salt-containing dusts from garbage incinerator plants.

2. Description of the Prior Art

In the cleaning process of flue gases from incinerator plants both gaseous and solid pollutants must be separated off.

The gaseous pollutants are essentially hydrogen chloride, sulfur dioxide and hydrogen fluoride and the solid pollutants fly ash containing toxic metal salts, for example the salts of lead, cadmium, chromium, mercury, tin, zinc, or their oxides or hydroxides.

For the purification of the flue gases from incinerator plants different methods are used. In these methods the purification is carried out in at least two stages; in the one stage the gaseous pollutants are separated and in a further stage the solid pollutants. To separate the gaseous and solid pollutants both wet and dry separators are employed.

Wet separator generally have a very high extraction capacity. Their disadvantage due to the process technology is however that the pollutants although separated from the air are afterwards in the water. Consequently, a further stage is necessary in order to process the pollutant-containing waste waters and this makes these methods very expensive. A further disadvantage is that slurries from the wet separation are more difficult and thus more expensive to collect, treat, transport and deposit than dusts from the dry separation.

These problems in wet flue gas purification have led in recent years to a lively development in the field of dry flue gas purification.

For dry separation of gaseous pollutants hydrated lime is blown into a reactor. The noxious gases are bound by sorption at the surface of the lime particles. In the quasi-dry method the suspension of hydrated lime is blown through jets into the reactor, the water component in the suspension having to be set so that the water can evaporate completely. The reaction products are separated in the following filter plant together with the dust particles.

In the neutralisation of acidic noxious gases by lime products the reaction compounds consist essentially of the salt calcium chloride ($CaCl_2$), calcium sulfate as dihydrate ($CaSO_4 \cdot 2H_2O$) and calcium fluoride ($CaF_2$).

In the depositing of these salt-containing dusts it is therefore to be ensured that only small salt quantities and amounts of toxic metal compounds get into the ground water, and indeed only in concentrations of the order of magnitude of the natural ground waters. These limit values are stipulated by the authorities.

The following techniques are known for depositing and treating salt-containing dusts from incinerator plants:

The salt-containing dusts are filled into tightly sealed containers and stored in an underground or aboveground dump. Storing in a suitable underground dump is admittedly very safe because the noxious substances can no longer get into the water cycle; on the other hand, this method is very expensive because the containers as well as the underground dump space and the depositing into the underground dump cause costs. Furthermore, the volume of safe underground dumps is limited and reserved for storing far more dangerous substances, in particular radioactive and highly toxic substances.

Storing dust-filled containers in aboveground dumps is no guarantee of a safe storage because firstly the containers might be damaged and secondly complete exclusion of water from an aboveground dump is not practicable.

DD-PS 149,136 describes a method for final storing of a great number of waste products which are mainly of mineral origin, usually have low water solubility and also almost all contain cement-compatible substances. These waste products are mixed with binding agents which harden by chemical rections, such as cement, lime or gypsum, or which are thermoplastic molten binders, such as bitumen, and brought into the dump area.

US-PS 3,274,784 describes a method for consolidating radioactive waste in which steps are taken which are intended to prevent the water access to the conditioning product and thus also any eluation. In this method a flowable mixture of radioactive water, cement and water is injected into a drill hole or into subterranean cavities. The drill hole or the subterranean cavity is sealed possibly before introducing the waste materials with a sealing agent, in particular cement slurries. After introducing the waste to be consolidated or solidified the filled cavities are sealed with a waste-free sealing agent, usually cement slurry.

To immobilize the salt-containing dusts as far as possible when stored in dumps it is known from DE-PS 3,545,592 by mixing with cement, water, aggregates, such as fly ash and possibly additives such as sodium sulfide, to make a waste body with edge layers which are free from special waste in that with the aid of a movable apparatus a layerwise buildup of the waste body is effected in one working operation by first forming as bottom layer a special waste-free cement/water mixture with a water/cement ratio of 0.2 to 0.8, then for building up the waste body admixing from the outside to the inside and from the bottom to the top to said cement/water mixture the special waste to be dumped with increasing concentration from 0 to 70 % by weight, simultaneously increasing the water/cement ratio to 1.2 by adding water, and subsequently in the direction towards the top layer and the lateral edge zones gradually reducing the special waste content again to 0 % by weight and reducing the water addition to return to the water/cement ratio to the previously set value between 0.2 to 0.8.

Finally, DE-PS 3,347,376 discloses a method of dumping a mixture of coal power station waste substances and waste substances from a desulfuring plant in which the mixture is mixed with addition of at least 3 % by weight hydrated lime with respect to the amount of dry residues to form a moist product which is brought to the dump and there compacted.

All the method developed so far have the disadvantages that for the stabilization valuable economic good must be used, such as bitumen and cement, in considerable proportions by weight, and secondly the limit values stipulated by the authorities are not reached in some cases. A disadvantage in the solidification during the depositing is that any defects cannot be remedied directly but only indirectly via processing of the percolating water.

SUMMARY OF THE INVENTION

The invention is based on the problem of providing a method of disposal of salt-containing dusts in which in factory manner and quality-controllably products of salt-containing dusts are generated which correspond to the reliable values of dump class 2 and thus also meet the requirements of using the compacted products as construction material in earth works. The method therefore proposes in a process of disposing of salt-containing dusts from incinertor plants the that whilst adding water the salt-containing dusts are intensively mixed with other waste materials, for example ashes and fly ashes from thermal power plants fired with hard coal or brown coal, waste materials from foundries, waste materials from calcium carbide production, said mixture containing at least 8 % hydrothermally reactive calcium oxide or equivalent amounts of other hydrothermally reactive calcium compounds and the water addition being so controlled that an optimum compaction is possible and the mixture is thereafter processed by compacting into rigid compacts and the compacts or briquettes are subsequently hardened in an autoclave by asturated steam at a pressure of at least 1 bar.

DESCRITPION OF THE PREFERRED EMBODIMENTS

The method according to the invention will be explained in detail with the aid of the following examples.

EXAMPLE 1

In a mixture of 65 parts by weight of salt-containing dust from a sludge incinerating plant are mixed intensively with 35 parts by weight of brown coal fly ash with the addition of 1 part by weight water for 10 parts by weight of solid. The chemical composition of the substance is shown in the following table:

|  | Salt-containing dust from sludge incineration in % by weight | Brown coal fly ash in % by weight |
| --- | --- | --- |
| $SiO_2$ | 3.9 | 4.8 |
| $Fe_2O_3$ | 26.9 | 35.3 |
| $Al_2O_3$ | 1.3 | 4.4 |
| $Mn_2O_3$ | 0.3 | — |
| CaO | 35.5 | 30.5 |
| MgO | 1.0 | 14.4 |
| $K_2O$ | 0.0 | — |
| $Na_2O$ | — | 0.5 |
| Cl | 6.5 | — |
| $SO_3$ | 6.8 | 4.2 |
| L.O.I. | 15.6 | 1.8 |

The mixture is compacted on a hydraulic press to briquettes or compacts with the dimensions 250×125×60 mm with a specific pressure of 250 bar.

Thereafter the compacts are hardened in an autoclave for four hours by saturated steam at a pressure of 16 bar. The duration of heating and cooling is one hour each.

The eluated values of these compacted products were determined on the basis of DIN 38 414 part 4. In the following table column I gives the admissible eluate values of the drinking water regulations of 1986 (German standards).

column II gives the admissible eluate values of dump class 2, column III gives the eluate values of the processed dusts and column IV the eluate values of the products made in accordance with Example 1.

|  | I drinking water regulations | II dump class 2 1987 | III salt-containing dust | IV compacted product |
| --- | --- | --- | --- | --- |
| pH | 6.5–9.5 | 5.5–12.0 | 12.4 | 9.6 |
| el. conductivity |  |  |  |  |
| mS/m | 200 | 300 | 2800 | 160 |
| Cl mg/l | 200 | (x) | 5900 | 270 |
| $SO_4$ mg/l | 250 | (x) | 2600 | 72 |
| Pb mg/l | 0.04 | 0.5 | 10.8 | 0.02 |
| Ba mg/l | — | 1 | 1.5 | 0.2 |
| Compressive strength |  |  | 10 N/mm$^2$ |  |

(x) is restricted by the conductivity.

EXAMPLE 2

Under otherwise identical test conditions to those in Example 1 50 parts by weight of a salt-containing dust from an incinerator plant were mixed with 50 parts by weight of a used quartz sand from a foundry of which 30%, i.e. 15 parts by weight, were ground with addition of 0.6 parts by weight water to 10 parts by weight solid.

The chemical composition of the substances is given in the following table:

|  | Salt-containing dust from incineration in % by weight | Used quartz sand from foundry 30% thereof ground |
| --- | --- | --- |
| $SiO_2$ | 28.9 | 95 |
| $Fe_2O_3$ | 3.1 | 1 |
| $Al_2O_3$ | 10.9 | 1 |
| $Mn_2O_3$ | 0.2 |  |
| CaO | 31.0 |  |
| MgO | 1.9 |  |
| $K_2O$ / $Na_2$ | 1.7 |  |
| Cl | 9.5 |  |
| $SO_3$ | 1.4 |  |
| L.O.I. | 11.2 | 2.2 |
| mean grain diameter | 15 μm | 400 μm |
| ground: |  | 55 μm |

The following table lists the eluate values of the salt-containing dust and those of the hydrothermally treated compacted product:

|  | salt containing dust | compacted product |
| --- | --- | --- |
| pH | 12.2 | 8.0 |
| el. conductivity |  |  |
| mS/m | 3,300 | 120 |
| Cl mg/l | 9,300 | 253 |
| $SO_4$ mg/l | 1,680 | 35 |
| Pb mg/l | 4.5 | 0.005 |
| Ba mg/l — | 1.7 | 0.07 |
| Compressive strength |  | 11 N/mm$^2$ |

EXAMPLE 3

Insted of ground quartz sand from the foundry as in Example 2 there were added to the mixture 15 % by weight dust from a hard coal fired circulating fluidized bed power plant or 15 % by weight of fly ash dust from a power plant fired with brown coal.

For the hydrothermally hardened compacted product similarly low eluate values were found as in Examples 1 to 2.

The chmeical composition of the dusts is given in the following table:

| | Dust from circulating fluidized bed firing in % by weight | Brown coal flue ash % by weight |
|---|---|---|
| $SiO_2$ | 44.5 | 8.8 |
| $Fe_2O_3$ | 11.3 | 12.9 |
| $Al_2O_3$ | 27.2 | 2.0 |
| $Mn_2O_3$ | — | — |
| CaO | 4.0 | 53.0 |
| MgO | 2.3 | 11.6 |
| $K_2O$ | 3.2 | 0.1 |
| $Na_2$ | 1.1 | 0.4 |
| Cl | — | — |
| $SO_3$ | 3.4 | 10.2 |
| L.O.I. | 2.3 | 0.8 |
| mean grain diameter | 12 μm | 18 μm |

The calcium oxide and silica-containing substances contained in the dusts form on hardening in the autoclave calcium silicate hydrates which give a good strength to the hardened product whilst other contents of the dusts and waste materials form sealing components reducing the pore space, such as calcium hydrate and calcium ferrite hydrate compounds and more readily soluble metal compounds are converted to less soluble compounds.

The dusts and waste materials are converted with small energy consumption to stabile products which are easy to handle and can be compactly stacked. The strength of these products is such that they can be used as building material, in particular in earth work.

The mixture of waste materials with salt-containing dust, ash and quartz sands and water is compacted to firm stable briquettes. The colume ratio of loose bulk material of the mixture to the compacted briquette is about 2:1. The compacting can be done by means of briquetting rollers or briquetting presses, hydraulic presses, impact presses, eccentric presses or the like or also with the aid of vibrators. The compacts are then hardened in an autoclave. to obtain a high strength the mixture to be compacted should contain at least 20 % by weight calcium oxide and at least 30 % by weight quartz-containing or silica-containing substances. To obtain a high strength at least 40 % of said quartz-containing or silica-containing substances should be contained in the form of dust or flour.

To ensure that the green briquettes are compactly stackable in the autoclave and the hardened briquettes on a dump the mixture is preferably processed to right-parallelepipedic briquettes having a weight of 1 to 10 kg.

Since silica-containing natural sands are also frequently available almost without costs, to obtain a good strength of the hydrothermally hardened compacts it may be expedient to add up to 40 % silica-containing natural sands.

The hydrothermally reactable lime content in the dusts is up to 20 %. To enable this large amount of lime to be bound a suitable reaction partner must be admixed with the dusts. The fundamental tests were carried out with quartz flours and sands. Thereafter the quartz flour was replaced by flue ash from hard-coal-fired power stations. However, other residual or waste substances are also possible as reaction partner.

If the proportion of hydrothermally reactable lime in the dusts is too small burnt lime or lime hydrate may be added to the mixture.

The solubility of the heavy metals in the consolidation products depends on the pH value of the pore solution. A substantial advantage of the method according to the invention resides in that the pH value of the pore solution can be influenced by the composition of the mixture and this makes it possible to set the optimum precipitation range for the heavy metals. In the consolidation for example with cement such a specific pH value influencing is not possible. The pH value of the pore solution cannot however be directly measured because the pore solution cannot be separated from the solid material. The pH value of a solution changes with the dilution of the solution and also depends on the grain size of the sample material. However, by washing the consolidation products the pH value of the pore solution can be determined indirectly. A standardized test method exists for this and it is described in DIN 38414, part 4.

We claim:

1. A method of disposing of salt-containing dusts from incinerator plants, comprising the steps of
   mixing salt-containing dusts with water and other waste materials,
   the waste materials comprising at least one of,
      ash and fly ash from thermal plants fired with lignite coal or hard coal,
      silica containing sands, in particular waste materials of foundaries containing quartz sands, or from waste rubble, or p2 waste materials from calcium carbide production,
   the mixture containing at least 8 % hydrothermally reactive calcium oxide or quivalent amounts of other hydrothermally reactive calcium compounds
   compacting the mixture into discrete compacts wherein
      the volume of the mixture is reduced by by compaction to at least approximately 50 % of the original volume; and
   hardening the discrete compacts in an autoclave by saturated steam with a pressure of at least 1 bar to form stable compacts.

2. A method of disposing of salt-containing dusts from incinerator plants, comprising the steps of:
   mixing salt-containing dusts with water and other waste materials,
   the waste materials comprising at least one of,
      ash and fly ash from thermal plants fired with lignite coal or hard coal,
      silica containing sands, in particular waste materials of foundaries containing quartz sands, or from waste rubble, or
      waste materials from calcium carbide production,
   the mixture containing at least 8 % by weight hydrothermally reactive calcium oxide or equivalent amounts of other hydrothermally reactive calcium compounds and at least 20% by weight calcium oxide and at least 30% by weight quartz-containing or silica-containing materials;
   compacting the mixture into discrete units and
   hardening the discrete units in an autoclave by saturated steam with a pressure of at least 1 bar.

3. A method according to claim 2, wherein the volume of the mixture is reduced by compaction to 50 % of the original volume.

4. A method according to claim 1, wherein the mixture is pressed to compacts by applying a specific compaction pressure of at least 100 bar.

5. A method according to claim 1, wherein the compacting of the mixture is effected by means fo briquetting presses or briquetting rollers.

6. A method according to claim 1, wherein the compacting of the mixture to compacts takes place by means of vibrators.

7. A method according to claim 1, wherein the mixture is processed to parallelepiped blocks of 1 to 10 kg weight.

8. A method according to claim 7, wherein the mixture is processed to cubic compacts.

9. A method according to any one of claims 1 to 7, wherein the mixture contains at least 20 % by weight calcium oxide and at least 30 % by weight quartz-containing or silica-containing materials.

10. A method according to claim 8, wherein at least 40 % of said quartz- or silica-containing materials are contained as dust or flour.

11. A method according to claim 1, wherein the specific compaction pressure lies in the range of 200 to 400 bar and the pressure of the saturated steam in the autoclave is above 15 bar.

12. A method according to claim 1, wherein silica-containing natural sands are added to the mixture of waste materials.

13. A method according to claim 1, wherein burnt lime or lime hydrate is admixed with the mixture of waste materials.

14. A method according to claim 1, wherein said step of mixing includes the step of adjusting the mixture composition so that the pH value of the eluate of the grain fraction 0 to 5 mm of the consolidation products, obtained by comminution and sifting, determined by the test method DIN 38414, part 4, lies in the range between 8 and 13.

15. A method according to claim 1 wherein said step of mixing salt-containing dusts with water and other waste materials comprises the step of:
adding water in an amount between 6 percent and 10 percent by weight of the mixture to enhance compact of the mixture.

16. A method according to claim 15 wherein the volume of the mixture is reduced by compaction to 50% of the original volume.

17. A method according to claim 15, wherein the mixture is pressed to discrete units by applying a specific compaction pressure of at least 100 bar.

18. A method according to claim 15, wherein the mixture is processed to parallelepiped blocks of 1 to 10 kg weight.

19. A method according to claim 15, wherein at least 40% of said quartz- or silica-containing materials are contained as dust or flour.

20. A method according to claim 15, wherein the specific compaction pressure lies in the range of 200 to 400 bar and the pressure of the saturated steam in the autoclave is at least 15 bar.

21. A method according to claim 15, wherein silica-containing natural sands are added to the mixture of waste materials.

22. A method according to claim 15, wherein burnt lime or lime hydrate is admixed with the mixture of waste materials.

23. A method according to claim 15, wherein said step of mixing includes the step of adjusting the mixture composition so that the pH value of the eluate of the grain fraction 0 to 5 mm of the consolidation products, obtained by comminution and sifting, determined by the test method DIN 38414, part 4, lies in the range between 8 and 13.

24. A method according to claim 15 wherein said step of mixing salt-containing dusts with water and other waste materials comprises the step of:
adding water in an amount between 6 percent and 10 percent by weight of the mixture to enhance compaction of the mixture.

25. A method of disposing of salt-containing dusts from incinerator plants, comprising the steps of:
mixing salt-containing dusts with water and other waste materials to form a mixture of waste materials and water,
the waste matertials comprising at least one of,
ash and fly ash from thermal plants fired with lignite coal or hard coal,
silica containing sands, in particular waste materials of foundaries containing quartz sands, or from waste rubble, or waste materials from calcium carbide production,
the mixture containing at least 8 % hydrothermally reactive calcium oxide or quivalent amounts of other hydrothermally reactive calcium compounds;
the water in said mixture being between 6% and 10% by weight of the waste materials to enhance compaction of the mixture;
compacting the mixture into discrete units and thereby reducing the original volume of the mixture;
hardening the compacted discrete units in an autoclave by saturated steam with a pressure of at least 1 bar.

26. A method according to claim 25, wherein the volume of the mixture is reduced by compaction to 50% of the original volume.

27. A method according to claim 25, wherein the mixture is pressed to discrete units by applying a specific compaction pressure of at least 100 bar.

28. A method according to claim 25, wherein the mixture is processed to parallelepiped blocks of 1 to 10 kg weight.

29. A method according to claim 28, wherein the mixture is processed to cubic compacts.

30. A method according to any one of claims 25 to 29, wherein the mixture contains at least 20% by weight calcium oxide and at least 30% by weight quartz-containing or silica-containing materials.

31. A method according to claim 30, wherein at least 40% of said quartz- or silica-containing materials are contained as dust or flour.

32. A method according to claim 25, wherein the specific compaction pressure lies in the range of 200 to 400 bar and the pressure of the saturated steam in the autoclave is at least 15 bar.

33. A method according to claim 25, wherein silica-containing natural sands are added to the mixture of waste materials.

34. A method according to claim 5, wherein burnt lime or lime hydrate is admixed with the mixture of waste materials.

35. A method according to claim 25, wherein said step of mixing includes the step of adjusting the mixture composition so that the pH value of the eluate of the grain fraction 0 to 5 mm of the consolidation products, obtained by comminution and sifting, determined by the test method DIN 38414, part 4, lies in the range between 8 and 13.

* * * * *